United States Patent
Herail

[11] 3,996,315
[45] Dec. 7, 1976

[54] VAPORIZATION APPARATUS FOR INTERNAL COMBUSTION ENGINES

[76] Inventor: René Laurent Hérail, 138 Bd Berthier, 75017 Paris, France

[22] Filed: Nov. 5, 1974

[21] Appl. No.: 521,194

[30] Foreign Application Priority Data

Nov. 9, 1973 France .............................. 73.39940
Dec. 19, 1973 France .............................. 73.45408

[52] U.S. Cl. ............................ 261/63; 48/180 A; 123/119 DB; 261/79 R
[51] Int. Cl.² ........................................ F02M 23/12
[58] Field of Search ................ 261/63, 79 R, 78 R; 251/65; 123/119 D, 119 DB, 124 R, 141; 48/180 R, 180 B, 180 A

[56] References Cited
UNITED STATES PATENTS

| | | | |
|---|---|---|---|
| 1,515,408 | 11/1924 | Puffer ............... | 48/180 R |
| 1,521,762 | 1/1925 | Duckworth ............... | 48/180 R |
| 2,158,819 | 5/1939 | Gianatasio ............... | 123/124 R |
| 2,569,316 | 9/1951 | Jerman ............... | 251/65 |
| 2,597,952 | 5/1952 | Rosenlund ............... | 251/65 |
| 2,721,791 | 10/1955 | Linn ............... | 48/180 R |
| 2,889,214 | 6/1959 | Linn ............... | 48/180 R |
| 3,414,242 | 12/1968 | Bouteleux ............... | 261/41 D |
| 3,561,409 | 2/1971 | August ............... | 48/180 R |
| 3,866,583 | 2/1975 | Pundt et al. ............... | 123/119 D |

FOREIGN PATENTS OR APPLICATIONS

| | | | |
|---|---|---|---|
| 5,392 | 1/1927 | Australia ............... | 48/180 R |
| 39,762 | 3/1932 | France ............... | 48/180 R |
| 781,563 | 5/1935 | France ............... | 48/180 R |
| 273,694 | 7/1928 | United Kingdom ............... | 48/180 B |

*Primary Examiner*—Tim R. Miles
*Assistant Examiner*—Gregory N. Clements
*Attorney, Agent, or Firm*—Pierce, Scheffler & Parker

[57] ABSTRACT

The invention concerns an apparatus for the vaporization of combustible mix for internal combustion engines. The apparatus is placed below the butterfly valve of the pulverizer, such as a carburetor. According to the invention the apparatus includes at least two conduits having different profiles and cross sections, the outlets of these being tangent one to another, one at least having a profile like a venturi, preferably the apparatus includes a series of small venturis set in crown shape all around a central venturi, the diameter of the latter being much bigger.

1 Claim, 2 Drawing Figures

VAPORIZATION APPARATUS FOR INTERNAL COMBUSTION ENGINES

FIELD OF THE INVENTION

This invention refers to the improvement of carburation in any internal combustion engine; more specifically it relates to the realization of gasification and homogenization of the carbureted mix, the use and position of conduits or borings having venturi shapes of different profile and cross section being made to achieve the gasification and homogeneousness by the strong whirling generated.

BACKGROUND OF THE INVENTION

In all classical carburetors, fuel is pulverized and driven to the cylinders without gasification being completed and without proper gas mixing. As a result droplets are carried by the feed flow and introduced in the cylinders in an unhomogeneous mix of gases and the cylinders receive unequal ratios of gas mixture. The droplets during the explosion disturb combustion, lowering temperature and output, causing pinging at low speed, giving dilution when the motor is cold. Moreover an unburned part of the droplets is emitted without having supplied the expected power and pollutes the atmosphere.

SUMMARY OF THE INVENTION

This invention consists in realizing carburation in three steps; The first one is made as usual by a pulverizer such as a carburetor, the second achieving gasification, the third vigorously mixing the gases. Such results are obtained by forcing the drizzle of fuel issued from the carburetor through conduits or boring having the shape of a "venturi". The diameters and profiles of these venturis are different, their outlets are tangent one to another. These venturis can be situated at different levels or not, they can be concentrical or not. When entering into a venturi the droplets undergo a flattening by compression followed immediately by a depression which draws them out, at the same time an addition of unsaturated warm air is provided, thus they explode easily making gases. Then we have streamlets of different richness free from any droplets, and next we must energetically mix to obtain the homogeneousness; this is made by drilling the venturis at different diameters causing various flowing speeds. As the outlets of the venturis are tangent one to another, the air streams coming in contact at different speeds produce a whirling motion which vigorously mixes the gases.

DESCRIPTION OF THE DRAWINGS

FIG. I is a plan view partly in cross-section; of the apparatus.

DESCRIPTION OF THE PREFERRED EMBODIMENTS

Figure 1:
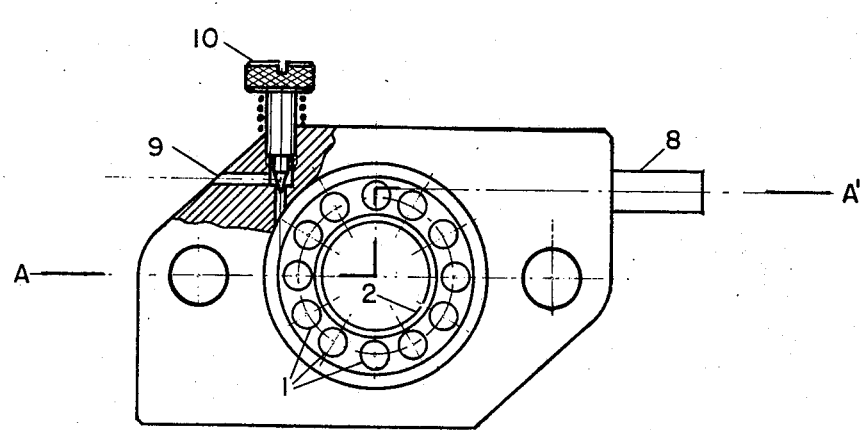
Figure 2:
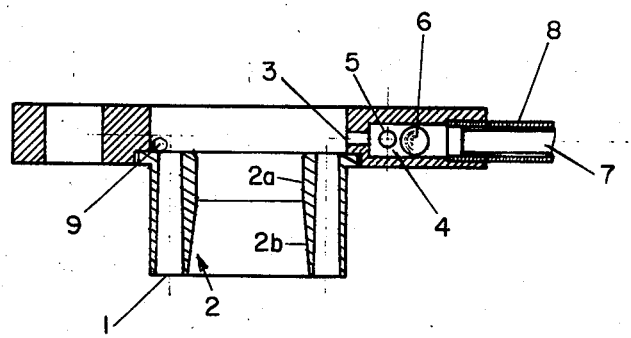
FIG. 2 is the cross sectional view of the apparatus taken along the line AA' of FIG. 1.

The apparatus is like a flange with a cylindrical core, the latter located in the intake pipe of the motor. The core is composed of a cylindrical array of circumferentially spaced relatively small diameter bores 1 of the same length and having a venturi-shaped profile drilled in crown shape all around a central and much larger diameter bore 2 likewise having a venturi-shaped profile. As shown in the drawing, the larger bore 2 has an elongated inlet section 2a followed by frusto-conical outlet section 2b. Opening above the crown of venturis 1 and tangentially there is an air intake port 3 connected with a conduit 4 admitting exterior air through a calibrated aperture 5. In the conduit 4 a ball 6 made of a magnetic material moves, and the conduit 4 is obstructed by a non-magnetic case containing a magnet 7 the extremity of the case 8 constituting a spacer. Another small air intake (9) opening tangentially above the crown of venturis 1 exactly underneath the idling aperture of the carburetor is fitted with a micrometrical prick punch screw 10 which limits the air. The device acts as follows: When the throttle valve of the carburetor (not shown) is open, the valve being located above the device of the present invention, the ball 6 is attracted by the magnet 7 and the air coming through the calibrated aperture 5 passing into the conduit (4) enters tangentially through the intake 3. This air is then mixed with the drizzle of fuel issued from the carburetor, then is forced through the venturis 1 and 2. When the throttle valve shuts, depression attracts the ball 6 which blocks up the air intake 3. The intermediate stages of the ball 6 position are determined by the competing forces of the depression versus the magnetic forces, thus admitting more or less air. At idle, the mix issued from the carburetor receives an addition of air coming from the air intake 9 limited by the micrometrical prick punch screw 10, then is forced through the venturis 1 situated underneath. Because the outlets of the venturis 1 and 2 are tangent one to another, the flowing speeds of the streamlets differ; the air streamlets in joining generate a powerful whirling which homogenizes the mixes.

This invention can be applied to any internal combustion engine regardless of the fuel, even when it is gaseous and everywhere a mix is to be homogenized and a steady flowing is to be obtained such as in fuel burners and exhaust pipes of internal combustion engines.

What is claimed is:

1. Apparatus for the vaporization of a fuel mixture for internal combustion engines, said apparatus being placed below the throttle valve of a conventional carburetor and which comprises a body member provided with a central bore having a frusto-conical outlet section, a cylindrical array of circumferentially spaced bores having frusto-conical outlet sections, and which surround and are of the same length as and are co-axial with said central bore but have a smaller diameter thereby to provide different flow-through speeds, the outlet edges of said smaller diameter bores being tangent to the outlet edge of said central bore, a first supplementary air intake port positioned adjacent the inlet end of one of said smaller diameter bores and tangent to the edge thereof, means controlled automatically in accordance with the amount of depression generated by operation of the throttle valve from one position to another for varying the amount of air passed through said first supplementary air intake port, a second supplementary air intake port positioned adjacent the inlet end of another one of said smaller diameter bores tangent thereto and directly beneath the idling orifice of the carburetor, and means for manually controlling the amount of air passed through said second supplementary air intake port comprising a micrometric prick punch screw for variably closing off the air passage through the port.

* * * * *